United States Patent
Jeong et al.

(10) Patent No.: US 12,241,981 B2
(45) Date of Patent: Mar. 4, 2025

(54) LiDAR-BASED OBJECT DETECTION METHOD AND APPARATUS

(71) Applicants: Hyundai Motor Company, Seoul (KR); Kia Corporation, Seoul (KR)

(72) Inventors: Mu Gwan Jeong, Seoul (KR); Nam Gyun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 394 days.

(21) Appl. No.: 17/899,040

(22) Filed: Aug. 30, 2022

(65) Prior Publication Data

US 2023/0228879 A1     Jul. 20, 2023

(30) Foreign Application Priority Data

Jan. 17, 2022    (KR) .................. 10-2022-0006746

(51) Int. Cl.
| | |
|---|---|
| *G01S 17/89* | (2020.01) |
| *G06V 10/26* | (2022.01) |
| *G06V 10/762* | (2022.01) |
| *G06V 10/771* | (2022.01) |

(52) U.S. Cl.
CPC .............. *G01S 17/89* (2013.01); *G06V 10/26* (2022.01); *G06V 10/762* (2022.01); *G06V 10/771* (2022.01)

(58) Field of Classification Search
None
See application file for complete search history.

(56) References Cited

U.S. PATENT DOCUMENTS

| | | | |
|---|---|---|---|
| 10,964,077 B2 | 3/2021 | Kim | |
| 10,989,804 B2 | 4/2021 | Schulz et al. | |
| 2019/0114484 A1* | 4/2019 | Keech | .................. G02B 6/1221 |
| 2020/0103518 A1* | 4/2020 | Schulz | .................. G01S 13/865 |
| 2020/0242820 A1* | 7/2020 | Kim | ......................... G01S 17/42 |
| 2021/0122364 A1* | 4/2021 | Lee | ........................ G06F 18/2413 |
| 2021/0279950 A1* | 9/2021 | Phalak | ..................... G06T 7/55 |
| 2022/0357453 A1* | 11/2022 | Zhou | .................... G06V 10/255 |
| 2023/0213654 A1* | 7/2023 | Kim | ...................... G01S 7/4808 |
| | | | 702/152 |

FOREIGN PATENT DOCUMENTS

| | | |
|---|---|---|
| JP | 2019-159380 A | 9/2019 |
| KR | 102083482 B1 | 3/2020 |
| KR | 102195164 B1 | 12/2020 |
| KR | 10-2021-0041304 A | 4/2021 |

OTHER PUBLICATIONS

Point cloud data reduction methods of octree-based coding and neighborhood search. Xie et al. (Year: 2011).*

* cited by examiner

*Primary Examiner* — Delomia L Gilliard
(74) *Attorney, Agent, or Firm* — Fox Rothschild LLP

(57) ABSTRACT

A LiDAR-based object detection method includes clustering a point cloud acquired from LiDAR, selecting a to-be-divided cluster among clusters generated in the clustering, and selecting division points according to a geometrical feature formed with adjacent points from among points belonging to the to-be-divided cluster, and dividing the to-be-divided cluster based on a representative point determined by at least some of the division points.

17 Claims, 16 Drawing Sheets

● : Lidar Point          ○ : Division Point
○ : Representative Point  ▓ : Division Point Cluster

LiDAR-BASED OBJECT DETECTION METHOD AND APPARATUS

PRIORITY

This application claims under 35 U.S.C. § 119(a) the benefit of Korean Patent Application No. 10-2022-0006746, filed on Jan. 17, 2022, which is hereby incorporated by reference as if fully set forth herein.

BACKGROUND OF THE DISCLOSURE

Field of the Disclosure

The present disclosure relates to a method and apparatus for detecting an object based on Light Detection And Ranging (LiDAR).

Discussion of the Related Art

Recently, as interest in autonomous driving technology has increased, a LiDAR-based object detection apparatus, which may be an essential object detection apparatus for autonomous driving, has actively been developed.

In general, the LiDAR-based object detection apparatus generally transmits laser beams to the surroundings, acquires laser beams reflected from an object as point cloud data, and detects the object using the acquired LiDAR data.

For object detection, point cloud data may be first preprocessed and then clustered according to a predetermined manner, and shapes may be extracted from the cluster data thus obtained.

Here, as one clustering method, grid-based clustering generates a grid map for preprocessed point cloud data, compares features of adjacent grids, and groups grids having similar features into one cluster.

This grid-based method may be a method of generating grid features using several points present in the respective grids, and comparing these features to determine whether the grids should be clustered into the same cluster. In this method, since Lidar points may be processed by grid to generate an output, there may be an advantage in real-time compared to a by-point-level processing method.

However, there may be points or feature information thereof not utilized to generate the grid features, and there may be a possibility of occurrence of information loss and mis-clustering.

That is, even though there may be actually two separate objects, points detected from the respective objects may be treated as close enough according to a grid resolution, and thus a problem may arise that the two objects may be grouped into one cluster.

For example, as illustrated in FIG. 1, when a vehicle may be located close to a stationary object of a road boundary, such as a guard rail, even though a first grid G1 may be for stationary object points and a second grid G2 may be for vehicle points, the two grids may be grouped into the same cluster to cause mis-clustering.

SUMMARY OF THE DISCLOSURE

Accordingly, the present disclosure may be directed to a LiDAR-based object detection method and apparatus that substantially obviate one or more problems due to limitations and disadvantages of the related art.

An object of the present disclosure may be to improve object detection capability through improved clustering for LiDAR point data.

Another object of the present disclosure may be to perform such improved clustering without significantly increasing computational cost.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objectives and other advantages and in accordance with the purpose of the disclosure, as embodied and broadly described herein, a LiDAR-based object detection method includes clustering points of a point cloud acquired from LiDAR, selecting a to-be-divided cluster among clusters generated in the clustering, and selecting division points according to a geometrical feature formed with adjacent points belonging to the to-be-divided cluster, and dividing the to-be-divided cluster based on a representative point determined by at least some of the division points.

The dividing may include selecting division points according to the geometrical feature among points belonging to the to-be-divided cluster, clustering the division points, and selecting a final division point cluster among clusters of the division points, and dividing the to-be-divided cluster using a representative point of the final division point cluster.

The dividing may be performed based on a straight line passing through the representative point.

The straight line may be obtained by connecting the representative point and an origin.

The dividing may be performed when a ratio of the number of points in at least one cluster divided from the to-be-divided cluster to the total number of points in the to-be-divided cluster may be less than or equal to a reference value.

One of two division point clusters may be selected as the final division point cluster, the two division point clusters having representative points forming maximum and minimum angles, respectively, with a reference line passing through an origin.

The final division point cluster may be selected based on a difference in the number of points between the two divided clusters to be generated after division.

After mapping the division points to a 2D grid map, the clustering of the division points may be performed based on a degree of proximity of grids.

Grids located as directly connected to each other among the grids including the division points may be determined as the same division point cluster.

The representative point may be determined by an average coordinate value of at least some of the division points.

The to-be-divided cluster may be selected according to the number of division points therein.

The geometrical feature may include an angle θ formed with the adjacent points.

The division points may be selected according to whether the angle θ may be an acute angle.

Whether the angle θ may be an acute angle may be determined using "1−cos θ".

The adjacent points may be points on the same layer as the one of the division points.

In another embodiment of the present disclosure, a LiDAR-based object detection apparatus includes a microprocessor, a memory, and an input/output device, in which the microprocessor executes the above-described detection method.

In another embodiment, a vehicle may comprise the LiDAR-based object detection apparatus as described herein.

It may be to be understood that both the foregoing general description and the following detailed description of the present disclosure may be exemplary and explanatory and may be intended to provide further explanation of the disclosure as claimed.

BRIEF DESCRIPTION OF THE DRAWINGS

The accompanying drawings, which may be included to provide a further understanding of the disclosure and may be incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
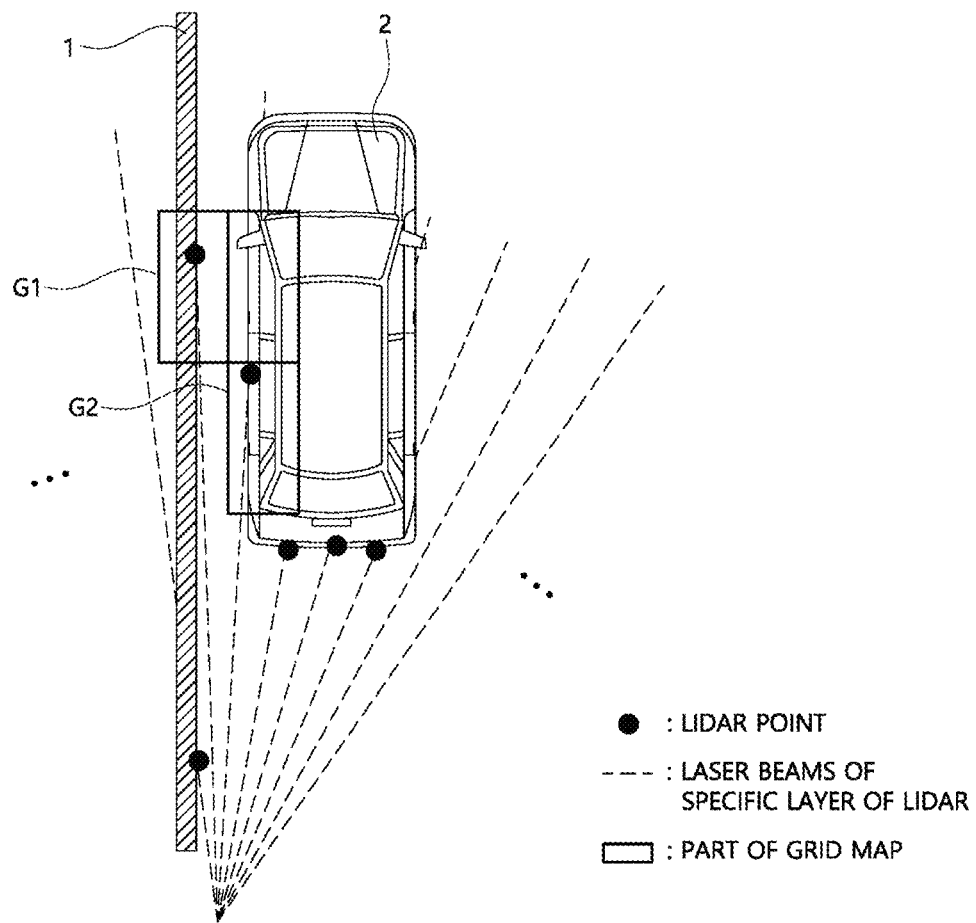
FIG. 1 is an example of grid-based clustering.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Further, in describing the embodiments disclosed in the present specification, when it may be determined that a detailed description of related publicly known technology may obscure the gist of the embodiments disclosed in the present specification, the detailed description thereof will be omitted. The accompanying drawings may be used to help easily explain various technical features and it should be understood that the embodiments presented herein may not be limited by the accompanying drawings. As such, the present disclosure should be construed to extend to any alterations, equivalents and substitutes in addition to those which may be particularly set out in the accompanying drawings.

Although terms including ordinal numbers, such as "first", "second", etc., may be used herein only to differentiate elements, the elements may not be construed to be limited by these terms. These terms may be generally only used to distinguish one element from another.

When an element may be referred to as being "coupled" or "connected" to another element, the element may be directly coupled or connected to the other element. However, it should be understood that another element may be present therebetween. In contrast, when an element may be referred to as being "directly coupled" or "directly connected" to another element, it should be understood that there may be no other elements therebetween.

A singular expression includes the plural expression unless the context clearly dictates otherwise.

In the present specification, it should be understood that a term such as "include" or "have" may be intended to designate that the features, numbers, steps, operations, elements, parts, or combinations thereof described in the specification may be present, and does not preclude the possibility of addition or presence of one or more other features, numbers, steps, operations, elements, parts, or combinations thereof.

In addition, the term "unit" or "control unit" may be only a widely used term for a name of a controller for controlling a specific function of a vehicle, and does not mean a generic function unit. For example, each unit or control unit may include a communication device configured to communicate with another control device or sensor to control a function assigned thereto, a memory configured to store an operating system or logic command and input/output information, and one or more processors configured to perform determination, calculation, decision, etc. necessary for controlling the function assigned thereto.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

Figure 2:
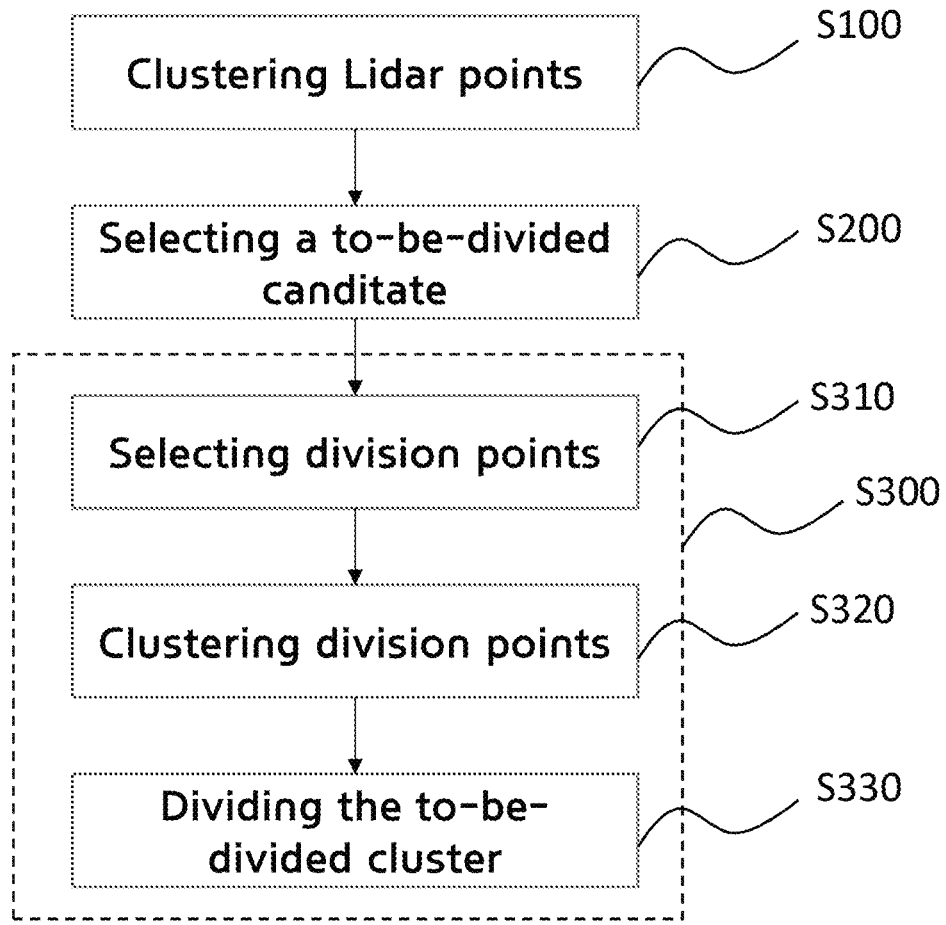
FIG. 2 is a flowchart of clustering in an object detection method according to an embodiment of the present disclosure.
Figure 3A:
FIGS. 3A to 3C are an example of a to-be-divided cluster.
Figure 3B:
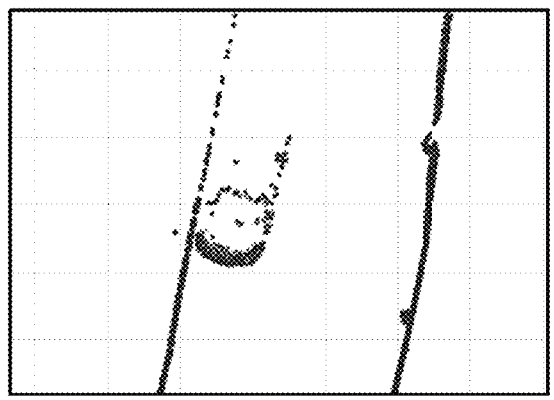
Figure 4:
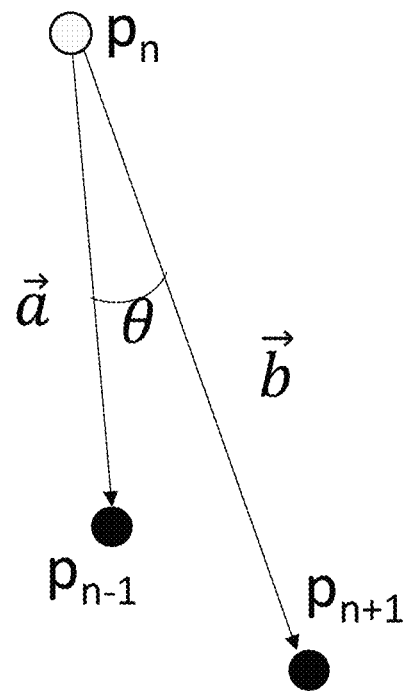
FIG. 4 illustrates an angle formed by a division point and adjacent points.
Figure 5:
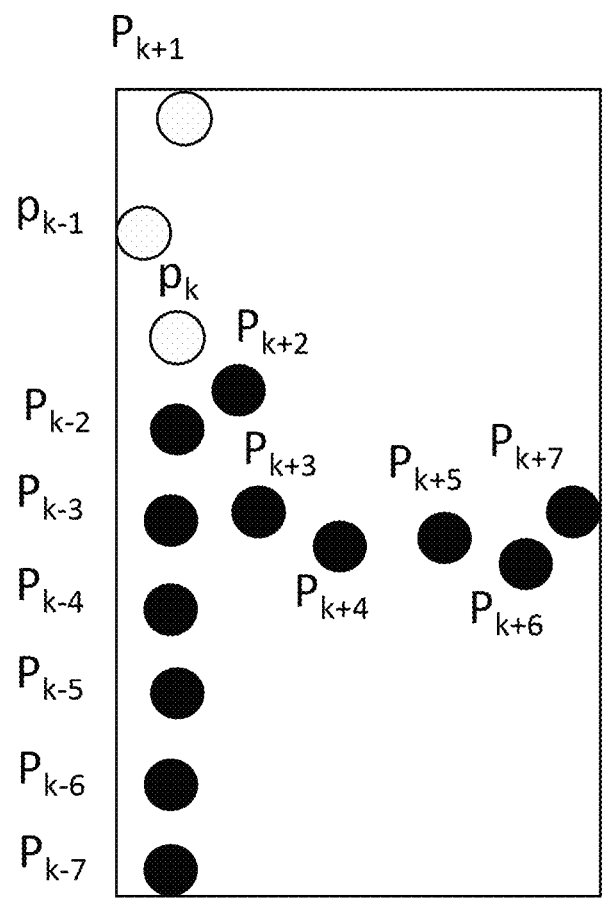
FIG. 5 is a conceptual diagram illustrating division points identified in one cluster.
Figure 7:
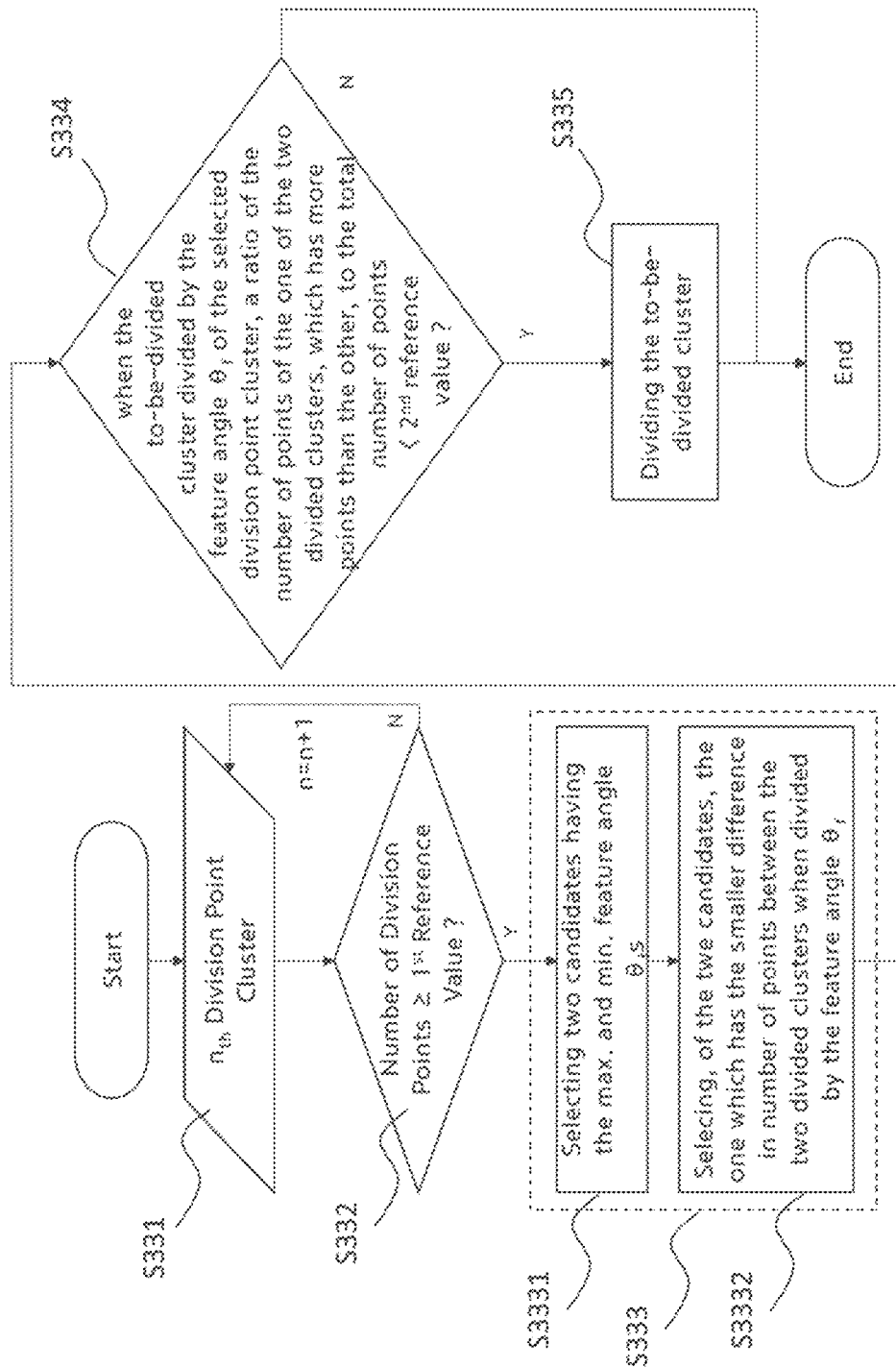
FIG. 7 is a flowchart illustrating a process of dividing the to-be-divided cluster.
Figure 8A:
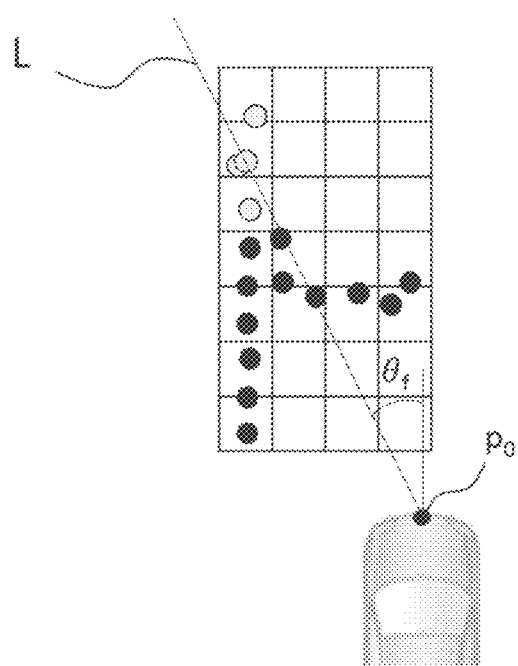
FIGS. 8A to 8C are diagrams conceptually illustrating a process of dividing the to-be-divided cluster.
Figure 8B:
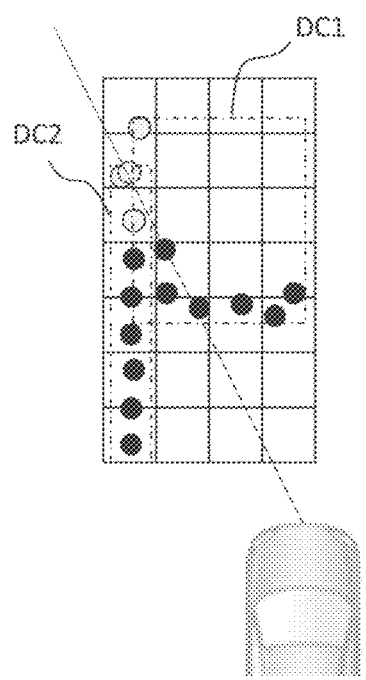
Figure 8C:
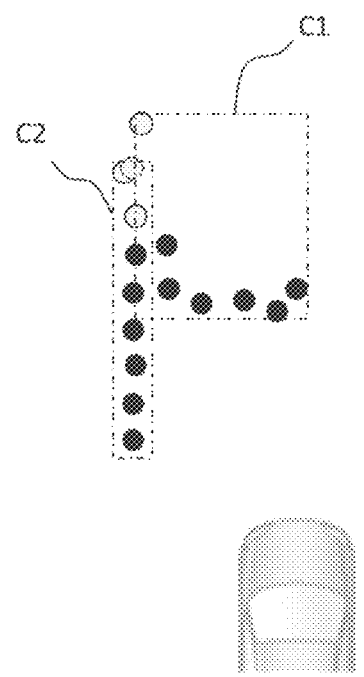

First, FIG. 2 is a flowchart of clustering in an object detection method according to an embodiment of the present disclosure, and FIGS. 3A to 3B are an example of a to-be-divided cluster. FIG. 4 illustrates an angle formed by a division point and adjacent points, and FIG. 5 is a conceptual diagram illustrating division points identified in one cluster. FIGS. 6A to 6D illustrate a process of clustering division points and a representative point of the clustering, and FIG. 7 is a flowchart illustrating a process of dividing the to-be-divided cluster. FIGS. 8A to 8C are diagrams conceptually illustrating a process of dividing the to-be-divided cluster The object detection method of the present embodiment includes a step S100 of clustering points of a point cloud obtained from LiDAR, a step S200 of selecting a to-be-divided candidate from among clusters generated in the step S100, and a step S300 of dividing a to-be-divided cluster.

In addition, the step S300 of dividing the to-be-divided cluster includes a step S310 of selecting division points (break points) from among LiDAR points belonging to the to-be-divided cluster, a step S320 of clustering the division points, and a step S330 of dividing the to-be-divided cluster using a division point cluster generated in the step S320.

The point cloud acquired from LiDAR first undergoes a preprocessing to delete points having low signal strength or reflectivity and points reflected by the vehicle body, thereby extracting only valid data, and calibration may be performed to match LiDAR points to a reference coordinate system of the vehicle.

Here, the present embodiment relates to a case where the point cloud acquired from LiDAR may be 3D data acquired by multi-layered scans. However, the present disclosure may not be limited thereto.

When the preprocessing for the point cloud ends, the step S100 of clustering the points of the point cloud based on grids may be performed.

For clustering, the preprocessed point cloud may be mapped to the grids, features of the grids may be generated using points included in each grid, and the features may be compared between grids in terms of similarity to determine whether to process the grids as the same cluster.

Subsequently, a to-be-divided cluster may be selected from among the clusters generated through the clustering step (S200).

Mis-clustering may be mainly caused by a dynamic object (for example, moving vehicle) and a temporary wall or a guardrail being grouped into one cluster. In addition, when there may be a motorcycle inbetween vehicles, mis-clustering may occur by these objects grouped into one cluster or the vehicle and a person grouped into one cluster.

The to-be-divided cluster may be preferably selected so that such mis-clusters may be targets.

In the present embodiment, the to-be-divided cluster may be selected using a division point to be described later.

For example, a cluster in which the number of division points may be equal to or greater than a reference value may be selected as the to-be-divided cluster.

Figure 3C:
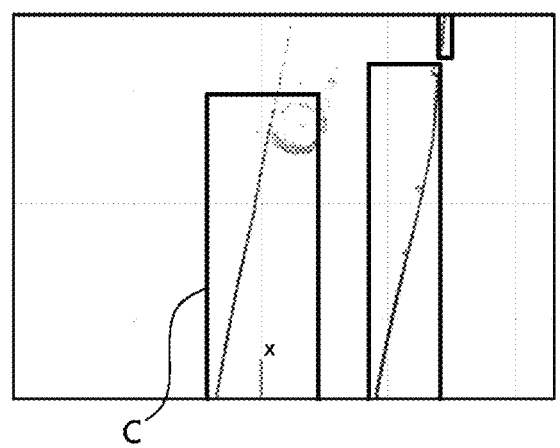

For example, FIGS. 3A to 3C are an example of a mis-cluster C in which a temporary wall and a vehicle may be grouped into one cluster (shown as a box), and illustrates the case where the cluster C may be selected as a to-be-divided cluster C based on a division point criterion. For reference, FIG. 3A is an actual photograph of an object detection target, FIG. 3B is a point cloud acquired by LiDAR, and FIG. 3C illustrates an example of a state in which clustering may be performed on the point cloud.

In the present embodiment, a division point may be selected based on a geometrical feature formed by adjacent points (S310).

For example, as illustrated in FIG. 4, when an angle θ formed by two front and back points $P_{n-1}$ and $P_{n+1}$ with reference to the index may be an acute angle, the corresponding point $P_n$ may be selected as a division point.

Such angle detection described above may be performed for points in the same layer, and when there may be no valid point among three consecutive indices, a point of an index immediately after the invalid point index may be used. For example, when there may be no valid point for an index '$P_{n+1}$' in FIG. 4, although not illustrated, a point of an index '$P_{n+2}$', which may be a subsequent index, may be used.

In addition, in determining whether the angle θ of FIG. 4 may be an acute angle, the following expression may be used.

$$1 - \cos\theta \qquad \text{[Expression 1]}$$

Here, cos θ may be as follows.

$$\cos\theta = \frac{\vec{a} \cdot \vec{b}}{|\vec{a}||\vec{b}|} \qquad \text{[Expression 2]}$$

The above Expression 1 has 0 as a minimum value and 2 as a maximum value in a range where θ may be greater than 0 and less than π, and tends to nonlinearly increase. That is, as the angle θ increases, the value of Expression 1 tends to increase.

Accordingly, through Expression 1, an angle corresponding to a center point in a triangle formed by three points may be digitized and used.

Expression 1 may be significantly useful in that it may be possible to check an acute angle condition for an angle without a trigonometric operation, the computational cost of which may be high.

Meanwhile, instead of the above-mentioned acute angle criterion, an optimal reference value may be determined based on data in an actual driving environment according to a sensor configuration and mounting position, and a point greater than or equal to the reference value may be selected as a division point.

FIG. 5 is an example of selecting a division point by applying the acute angle criterion.

First, a point cloud cluster of FIG. 5 is a simplified simulation of the to-be-divided cluster illustrated in FIGS. 3A to 3C. In the point cloud cluster, points of indices '$P_{k+1}$' to '$P_{k+7}$' may be data related to the vehicle, and indices '$P_{k-7}$' to '$P_k$' may be data related to the temporary wall.

When the acute angle criterion may be applied to the points of FIG. 5, three points from '$P_{k-1}$' to '$P_{k+1}$' may be selected as division points. Even though three division points may be illustrated in FIG. 5, this illustration may be merely an example. Division points may be present for each layer, and also more than three division points may be present on the same layer.

Once all the division points for the to-be-divided cluster may be selected, next, the step S320 of clustering the division points may be performed.

Figure 6A:
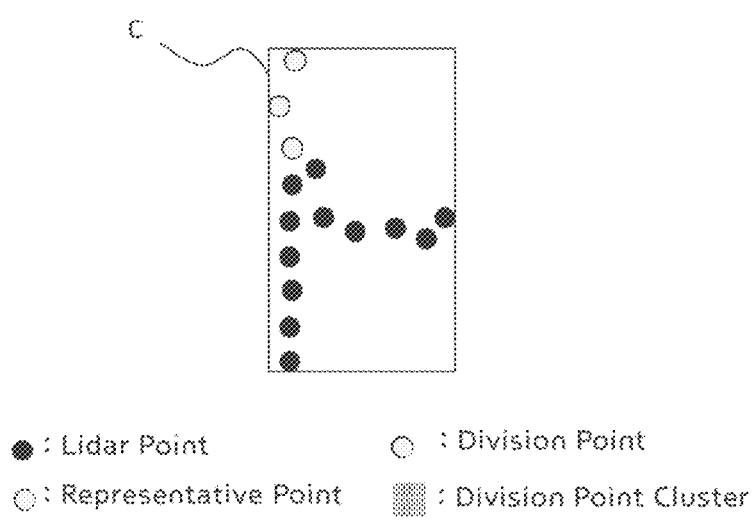
FIGS. 6A to 6D illustrate a process of clustering division points and a representative point of the clustering.
Figure 6B:
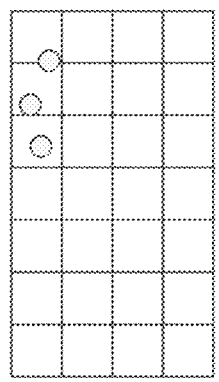
Figure 6C:
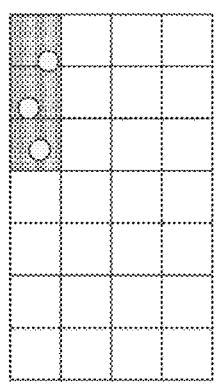

Referring to FIGS. 6A to 6C, first, division points may be mapped to a 2D grid map as illustrated in FIG. 6B. Here, a grid may be a square as an example, and the size of the grid may be preferably determined so that division points detected in the same object may be processed as one cluster by checking data in which division points may be dense.

For the division point clustering, when there may be a grid adjacent to a certain grid as illustrated in FIG. 6C, division points of those grids may be labeled as belonging to the same cluster.

Figure 6D:
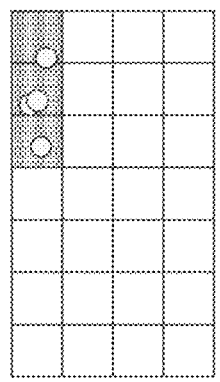

In addition, for the division point cluster determined in this way, a representative point may be determined using an average value of the division points belonging thereto as illustrated in FIG. 6D.

In the present embodiment, the representative point may be newly created as a point having average (coordinate) values of the corresponding division points. However, the representative point may be only used to represent the corresponding division point cluster, and may not be used as an object detection point.

In addition, determination of the representative point may not be limited to the above case, and for example, unlike the present embodiment, a division point closest to the average-valued coordinates may be determined as the representative point.

A plurality of division point clusters may be present in one to-be-divided cluster C, and it may be necessary to select an optimum division point cluster among these division point clusters.

FIG. 7 illustrates a process in which a final division point cluster to be used for division of the to-be-divided cluster may be selected, which will be described in detail below with reference to FIG. 7.

First, it may be determined whether the number of division points may be equal to or greater than a first reference value for each of the division point clusters (S331 and S332).

Determining whether the number of division points may be equal to or greater than the first reference value serves to determine the validity of the corresponding division point cluster, and an invalid cluster may be excluded from the division point clusters.

Here, the first reference value, which may be a criterion for determining validity, may be experimentally obtained through data on actual driving, and an optimal value may be preferably determined through many experiments.

A final cluster may be selected from among the valid clusters remaining. In order to minimize the amount of calculation, candidates may be first selected using feature angles $\theta_f$ of the clusters, and among the candidate clusters, one that satisfies conditions to be described later may be finally selected (S333).

In the present embodiment, among the valid clusters, a cluster having the largest feature angle $\theta_f$ and a cluster having the smallest feature angle $\theta_f$ may be selected as candidates (S3331). When the to-be-divided cluster may be divided by straight lines of the two feature angle $\theta_{fs}$ of the two clusters selected as candidates, the one having the smaller difference in the number of points between the two divided clusters may be selected as the final cluster (S3332).

Here, the feature angle $\theta_f$ may be an angle of a straight line L connecting the representative point of the division point cluster and the origin $P_0$, as illustrated in FIGS. 8A to 8C. In addition, here, the origin $P_0$ may be determined as coordinates corresponding to a LiDAR position.

In the present embodiment, the amount of calculation may be significantly reduced by selecting two clusters of the maximum and minimum values as final candidates based on the feature angle $\theta_f$. Since clusters each having the number of division points equal to or greater than the first reference value may be targeted, an effective division point cluster may be obtained with only two candidates, which was confirmed proved to be through actual data.

Once the final division point cluster may be selected, it may be determined whether, when the to-be-divided cluster may be divided by the straight line L of the feature angle $\theta_f$ of the selected division point cluster, a ratio of the number of points of the one of the divided clusters DC1 and DC2, which has more points than the other, to the total number of points may be smaller than a second reference value (S334).

Here, when it may be determined that the corresponding ratio may be equal to or greater than the second reference value, it may be determined that the corresponding cluster may be an invalid division point cluster, and a division process may be ended without change in order to prevent additional calculation costs.

When it may be determined that the ratio may be smaller than the second reference value, final division may be performed by the straight line L of the feature angle $\theta_f$ to obtain final two clusters C1 and C2 from the to-be-divided cluster C (S335). After division, the existing cluster C may be deleted and the final two clusters C1 and C2 may be registered as new clusters.

Here, the second reference value may be experimentally obtained through actual driving data, and an optimal value may be preferably determined through many experiments.

Figure 9:
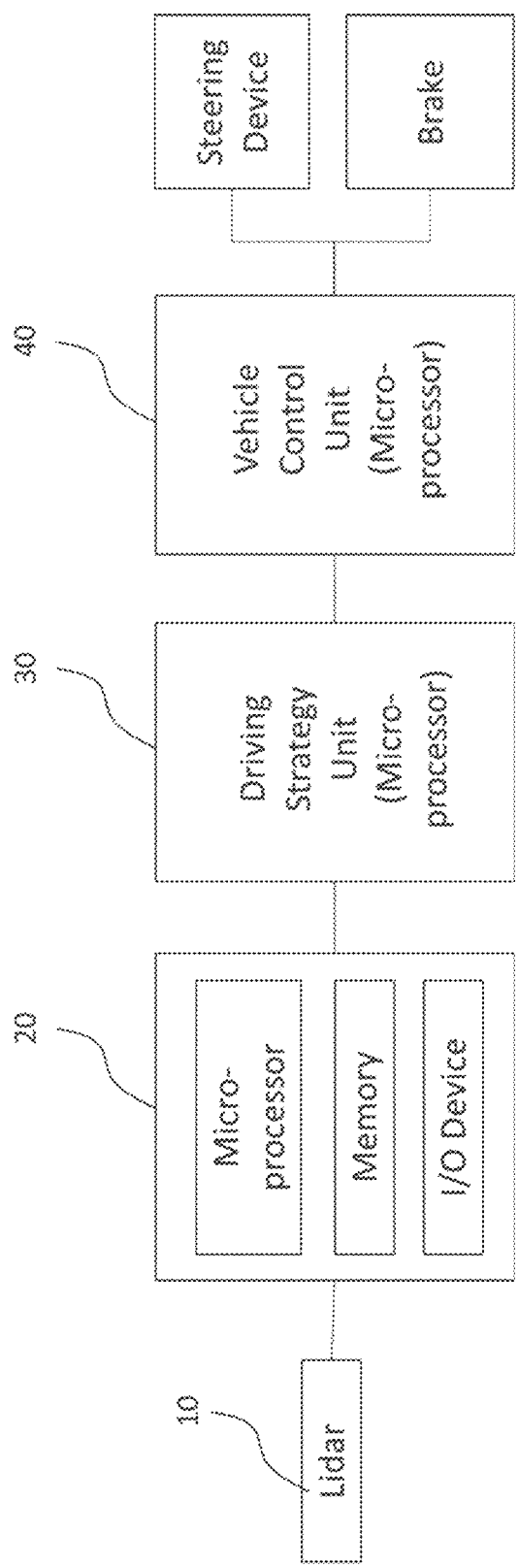
FIG. 9 is a block diagram of a LiDAR-based object detection apparatus and a driving control system including the same according to an embodiment of the present disclosure.

Meanwhile, a LiDAR-based object detection apparatus 20 according to an embodiment of the present disclosure may be an apparatus made to execute the method of the above-described embodiment, and may be included in a driving control system together with a driving strategy unit 30 and a vehicle control unit 40 as illustrated in FIG. 9.

As illustrated in FIG. 9, the object detection apparatus 20 receives point cloud data from a LiDAR 10, executes object detection, and outputs a result to the driving strategy unit 30.

As illustrated in the figure, the object detection apparatus 20 may include a microprocessor, a memory, and an input/output device.

Here, the input/output device may be a device configured to receive data from the LiDAR 10 and output a detection result to the driving strategy unit.

In addition, the microprocessor may be a place for detecting an object by performing necessary data processing on a point cloud, and the method of the above-described embodiment may be loaded thereon as a program.

The memory stores a detection program executed by the microprocessor and related data such as the reference values.

In addition, the driving strategy unit 30 establishes a driving strategy for the vehicle according to a result detected by the object detection apparatus 20, and outputs a result to the vehicle control unit 40.

According to the result, the vehicle control unit 40 transmits a control signal for a steering device and/or a braking device to each corresponding device so that the driving strategy established by the driving strategy unit 30 may be executed.

According to the present disclosure, it may be possible to obtain improved object detection capability by providing an improved clustering result for LiDAR point data.

In addition, according to at least one embodiment of the present disclosure, it may be possible to perform such improved clustering without significantly increasing computational cost.

It will be apparent to those skilled in the art that various modifications and variations may be made in the present disclosure without departing from the spirit or scope of the disclosure. Thus, it may be intended that the present disclosure cover the modifications and variations of this disclosure provided they come within the scope of the appended claims and their equivalents.

What is claimed is:

1. A LiDAR-based object detection method comprising:
   obtaining a point cloud for surrounding environment by use of LiDAR;
   clustering, by a microprocessor, points of the point cloud acquired from the LiDAR;
   selecting, by the microprocessor, a to-be-divided cluster among clusters generated in the clustering; and
   selecting, by the microprocessor, division points according to a geometrical feature formed with adjacent points from among points belonging to the to-be-divided cluster, and dividing the to-be-divided cluster based on a representative point determined by at least some of the division points.

2. The LiDAR-based object detection method according to claim 1, wherein the dividing includes:
   selecting division points according to the geometrical feature among points belonging to the to-be-divided cluster;
   clustering the division points; and
   selecting a final division point cluster among clusters of the division points, and dividing the to-be-divided cluster using a representative point of the final division point cluster.

3. The LiDAR-based object detection method according to claim 2, wherein the dividing is performed based on a straight line passing through the representative point.

4. The LiDAR-based object detection method according to claim 3, wherein the straight line is obtained by connecting the representative point and an origin.

5. The LiDAR-based object detection method according to claim 2, wherein the dividing is performed when a ratio of a number of points in at least one cluster divided from the to-be-divided cluster to a total number of points in the to-be-divided cluster is less than or equal to a reference value.

6. The LiDAR-based object detection method according to claim 2, wherein one of two division point clusters is selected as the final division point cluster, the two division point clusters having representative points forming maximum and minimum angles, respectively, with a reference line passing through an origin.

7. The LiDAR-based object detection method according to claim 6, wherein the final division point cluster is selected based on a difference in a number of points between two divided clusters when the to-be-divided cluster divided by a feature angle thereof.

8. The LiDAR-based object detection method according to claim 2, wherein, after mapping the division points to a 2D grid map, the clustering of the division points is performed based on a degree of proximity of grids.

9. The LiDAR-based object detection method according to claim 8, wherein grids located as directly connected to each other among the grids including the division points are determined as the same division point cluster.

10. The LiDAR-based object detection method according to claim 1, wherein the representative point is determined by average coordinate values of at least some of the division points.

11. The LiDAR-based object detection method according to claim 1, wherein the to-be-divided cluster is selected according to a number of division points therein.

12. The LiDAR-based object detection method according to claim 1, wherein the geometrical feature includes an angle $\theta$ formed with the adjacent points.

13. The LiDAR-based object detection method according to claim 12, wherein the division points are selected according to whether the angle $\theta$ is an acute angle.

14. The LiDAR-based object detection method according to claim 13, wherein whether the angle $\theta$ is an acute angle is determined using "$1-\cos\theta$".

15. The LiDAR-based object detection method according to claim 12, wherein the adjacent points are points on the same layer as the one of the division points.

16. A LiDAR-based object detection apparatus comprising:
   a microprocessor;
   a memory; and
   an input/output device,
   wherein the microprocessor executes the method according to claim 1.

17. A vehicle comprising the LiDAR-based object detection apparatus of claim 16.

* * * * *